(12) United States Patent
Klein et al.

(10) Patent No.: US 10,539,113 B2
(45) Date of Patent: Jan. 21, 2020

(54) METHOD FOR OPERATING A BELT-DRIVEN STARTER GENERATOR

(71) Applicant: SEG Automotive Germany GmbH, Stuttgart (DE)

(72) Inventors: Benjamin Klein, Bietigheim-Bissingen (DE); Tobias Trzebiatowski, Stuttgart (DE)

(73) Assignee: SEG Automotive Germany GMBH, Stuttgart (DE)

( * ) Notice: Subject to any disclaimer, the term of this patent is extended or adjusted under 35 U.S.C. 154(b) by 282 days.

(21) Appl. No.: 15/574,281

(22) PCT Filed: Jun. 7, 2016

(86) PCT No.: PCT/EP2016/062867
§ 371 (c)(1),
(2) Date: Nov. 15, 2017

(87) PCT Pub. No.: WO2016/202638
PCT Pub. Date: Dec. 22, 2016

(65) Prior Publication Data
US 2018/0135587 A1     May 17, 2018

(30) Foreign Application Priority Data

Jun. 18, 2015    (DE) .......................... 10 2015 211 251

(51) Int. Cl.
*F02N 15/08*      (2006.01)
*F02B 67/06*      (2006.01)
(Continued)

(52) U.S. Cl.
CPC ........... *F02N 15/08* (2013.01); *B60W 30/186* (2013.01); *B60W 30/192* (2013.01); *F02B 67/06* (2013.01);
(Continued)

(58) Field of Classification Search
CPC .... F02N 15/08; F02N 11/04; F02N 2200/042; B60W 30/186; B60W 30/192;
(Continued)

(56) References Cited

U.S. PATENT DOCUMENTS 10,029,695 B1 *   7/2018   Gibson ................. B60W 20/50
10,183,675 B2 *   1/2019   Nozaki ................. B60W 20/40
(Continued)

FOREIGN PATENT DOCUMENTS

| CN | 1732339 A | 2/2006 |
| CN | 101400878 A | 4/2009 |
| CN | 102530512 A | 7/2012 |
| DE | 19949824 A1 | 4/2001 |
| DE | 10112568 A1 | 10/2002 |
| DE | 10155199 A1 | 5/2003 |

(Continued)

OTHER PUBLICATIONS

International Search Report dated Sep. 20, 2016, of the corresponding International Application PCT/EP2016/062867 filed Jun. 7, 2016.

*Primary Examiner* — Gertrude Arthur Jeanglaude
(74) *Attorney, Agent, or Firm* — Norton Rose Fulbright US LLP

(57) ABSTRACT

A method for operating a belt-driven starter generator of an internal combustion engine, in which a time interval between an onset of a rotary motion of the belt-driven starter generator and an onset of a rotary motion of the internal combustion engine is determined, the determined time interval is compared to a reference value, and the structural change of a belt of the belt-driven starter generator is inferred therefrom, and a torque of the belt-driven starter generator and/or a torque of a component connected to the belt is restricted as a function of the structural change of the belt.

12 Claims, 5 Drawing Sheets

(51) Int. Cl.
*F16H 7/12* (2006.01)
*B60W 30/186* (2012.01)
*B60W 30/192* (2012.01)
*F16H 7/08* (2006.01)
*F02N 11/04* (2006.01)
*F16H 7/02* (2006.01)

(52) U.S. Cl.
CPC ............ *F16H 7/1281* (2013.01); *F02N 11/04* (2013.01); *F02N 2200/042* (2013.01); *F16H 7/02* (2013.01); *F16H 2007/0874* (2013.01)

(58) Field of Classification Search
CPC .......... F02B 67/06; F16H 7/1281; F16H 7/02; F16H 2007/0874
USPC ........................................................... 701/22
See application file for complete search history.

(56) References Cited

U.S. PATENT DOCUMENTS

| | | | |
|---|---|---|---|
| 2004/0255879 A1* | 12/2004 | Zaytsev | ............... F01B 9/02 123/55.2 |
| 2012/0158226 A1 | 6/2012 | Prucka et al. | |
| 2013/0131899 A1 | 5/2013 | Jung et al. | |
| 2013/0138280 A1 | 5/2013 | Kim | |

FOREIGN PATENT DOCUMENTS

| | | |
|---|---|---|
| DE | 10235533 A1 | 2/2004 |
| DE | 10349875 A1 | 5/2005 |
| DE | 102004060067 A1 | 6/2006 |
| DE | 102005029791 A1 | 1/2007 |
| DE | 112007001373 T5 | 4/2009 |

\* cited by examiner

METHOD FOR OPERATING A BELT-DRIVEN STARTER GENERATOR

BACKGROUND INFORMATION

The present invention relates to a method for operating a belt-driven starter generator of an internal combustion engine, and to an arithmetic unit and a computer program for its implementation.

BACKGROUND INFORMATION

Electric machines in motor vehicles can be used as what is generally known as starter generators. On the one hand, their task consists of starting the internal combustion engine during the operation of the electric machine in the motor mode; on the other hand, it consists of generating current for the vehicle electrical system and of charging the battery of the motor vehicle during the operation of the electric machine in the generator mode. Such electric machines are able to be connected to the internal combustion engine or to the crankshaft via a belt, e.g., via the ribbed V-belt of the internal combustion engine (known as belt-driven starter generators, BSG).

In most cases, special properties of the belt, such as its length, are precisely adapted to the system that is made up of a starter generator, an internal combustion engine and possibly additional components connected to the belt, such as ventilators or coolant pumps. Wear and an elongation of the belt may lead to a restricted function of the system, e.g., to decreasing preloading, and thus to a decreasing transmittable torque.

A method for the detection of slip in the drive mechanism of starter generator systems is described in German Patent Application No. DE 101 12 568 A1. Slip is detected at a comparison stage, which is supplied with input variables that are dependent upon the rate of rotation, especially a rate-of-rotation of a three-phase current generator and a crankshaft speed.

SUMMARY

According to the present invention, a method for operating a belt-driven starter generator of an internal combustion engine as well as an arithmetic unit and a computer program for its execution are provided.

The method utilizes the measure of determining a time interval between an onset of a rotary motion of the belt-driven starter generator (or more precisely, its rotor), and an onset of a rotary motion of the internal combustion engine (or more specifically, its crankshaft), and of inferring, based on a comparison of this time interval with a reference value, a structural change of the belt of the belt-driven starter generator, in particular a belt elongation and/or belt wear. A structural belt change, e.g., an elongation (especially due to aging of the tensioning cord) or wear (such as wear of the belt surface, in particular of the ribs, which causes the belt for the belt drive to become longer, or a change in the E-modulus) has an effect on the measured time period, so that a change in the time period allows an inference of a structural belt change.

A torque of the belt-driven starter generator is restricted or a maximally permitted torque of the belt-driven starter generator is reduced as a function of the structural change detected in this manner. Alternatively or additionally, however, it is also possible to restrict (e.g., to zero) a torque of a component connected to the belt, such as a ventilator or a coolant pump. More specifically, the torques of all components involved in the belt drive are restricted to the same degree. The reduction may be predefined especially as a function (e.g., a steady function, or a unit step function) of an extent of the structural change of the belt, but the restriction may also take place to a predefined reduced value.

A possibility is provided for the timely detection of a structural change of the belt that exceeds a permissible measure. By restricting the torque in response to the detection of a structural change, excessive loading of a belt that already exhibits signs of wear and a further acceleration of the wear or an elongation of the belt are prevented. Damage to the belt or even tearing of the belt and a failure of the belt drive are therefore able to be avoided. The service life of the belt is able to be extended, so that a timely exchange is able to take place, in particular.

There is no need to exchange the belt at fixedly predefined time intervals or after a fixedly stipulated number of operating hours. An exchange of belts that exhibit only a slight elongation/wear and may still be used without constituting a safety risk is therefore avoided. Instead, the belt may be exchanged whenever it is advisable on account of the detected belt change. Costs are able to be reduced and material saved. An expenditure of time required for unnecessary service operations is also able to be prevented. In addition, the method is implementable using means that are ordinarily available anyway. Additional sensors etc. are not required.

In an advantageous manner, the time interval between the onset of the rotary motion of the belt-driven starter generator and the onset of the rotary motion of the internal combustion engine may be utilized for checking the belt change. This is due to the fact that, starting from a position of rest when no torque is applied at the belt drive and the same tension is present on the slack and taut sides, the taut side is first shortened and the slack side is lengthened following the onset of the rotary motion of the starter generator, until the internal combustion engine breaks away. The time required for the shortening and lengthening depends on the belt structure, in particular on the belt length and the belt state.

The reference value in particular represents a value of the time interval for a new reference belt that exhibits no elongation or wear.

A structural belt change that exceeds a permissible measure is preferably detected when a difference between the determined time interval and the reference value reaches or exceeds a threshold value. Depending on the magnitude of this difference, a conclusion especially as to the extent of the belt change may be drawn. Within the scope of the present invention, the structural belt change that exceeds a permissible measure preferably leads to a restriction of the loading of the belt or to a limitation of the torque of the belt-driven starter generator and/or of the component of the belt drive.

In an advantageous manner, the component connected to the belt is deactivated as a function of the structural change of the belt. Especially in the case of a heavily worn belt, additional loading of the belt by the corresponding component is able to be minimized in this way.

The torque of the belt-driven starter generator or of the component of the belt drive is preferably restricted when the structural change of the belt and/or preferably when the respective difference between the determined time interval and the reference value reach(es) a threshold value. Depending on the extent of the belt change or depending on the degree to which the time interval exceeds the threshold value, the respective torque is able to be restricted to different degrees.

The time interval is advantageously determined when the internal combustion engine is started (i.e., ignited) with the aid of the starter generator. More specifically, the time interval is determined upon each start of the internal combustion engine. It is therefore possible to determine in particular a trend in the change of the time interval over time. As soon as the starter generator has been set into rotary motion, torque is transmitted to the internal combustion engine by way of the belt. As soon as the torque is high enough, in particular when it reaches or exceeds what is known as a breakaway torque of the internal combustion engine, the internal combustion engine breaks away. More specifically, upon each start of the internal combustion engine, it is thus determined as a function of the current structural change whether or not the torque of the belt-driven starter generator is to be restricted.

As an alternative, the time interval may be determined (especially only) during the start of the internal combustion engine when the internal combustion engine has not been operated over a specific period of time prior to this particular startup, so that it can be ensured that the belt and the belt tensioner are in their respective positions of rest. This guarantees that an accurate conclusion may be drawn regarding a structural change of the belt, and that the torque will not be erroneously restricted.

A multitude of time intervals is preferably determined. To do so, a respective time interval is determined across a multitude of starts of the internal combustion engine, in particular, and a belt change is inferred especially from the multitude of time intervals. For example, the time interval may vary from measurement to measurement on account of environmental conditions such as different temperatures, wetness and dew. A determination and evaluation of the multitude of time intervals prevents in particular an incorrect inference of a belt change if the threshold value has been attained for a brief period of time due to unfavorable environmental conditions. A belt change is inferred only if the threshold value is reached permanently.

The multitude of time intervals is preferably evaluated statistically and compared with the reference value. A statistical mean value is advantageously determined from the multitude of time intervals and compared with the reference value. Alternatively or additionally, a time sequence analysis is preferably carried out, during which a trend or a trend line of the time interval is able to be determined, in particular.

At the start of the rotary motion of the belt-driven starter generator, a first time stamp is advantageously determined or received. At the start of the rotary motion of the internal combustion engine, a second time stamp is preferably determined or received. The first and/or second time stamp is determined in particular by the respective control unit of the starter generator or by the starter generator of the internal combustion engine.

The time interval is determined from the first time stamp and the second time stamp. This determination of the time interval and its analysis is able to be carried out in the control unit of the starter generator and/or in the control unit of the internal combustion engine and/or in a further, third control unit. Depending on the particular control unit in which the determination is performed, the corresponding time stamps are transmitted from the remaining control units to this particular control unit and received by said control unit.

The determination as to whether or not the torque of the belt-driven starter generator or of the component of the belt drive will be restricted as a function of the structural change may be carried out in the control unit of the starter generator and/or the internal combustion engine and/or in a further, third control unit. The belt-driven starter generator is preferably notified when its torque is being restricted. Preferably, further components involved in the belt drive are also made aware of this restriction.

The control units are in a data-transmitting connection, in particular via a field bus such as a CAN bus. The respective time stamps are able to be determined and transmitted in synchrony with the clock of the field bus, in particular (e.g., in synchrony with a 1 MHz bus clock, which corresponds to an increment of 1 μs). It is possible to use the time stamps of the field bus communication, in particular.

An error entry in an error memory is preferably made when a belt change is detected. As an alternative or in addition, a visual and/or acoustic notification may preferably be output; for example, a warning light in a region of the instrument panel of the vehicle is able to be activated. A driver of the vehicle is therefore able to be made aware of the fact that the belt should be exchanged.

An arithmetic unit according to the present invention, e.g., a control unit of a motor vehicle, is configured, in particular in terms of programming technology, to carry out a method according to the present invention.

The implementation of the method in the form of a computer program is also advantageous because it causes particularly low expense, especially when an executing control unit is also used for additional tasks and is therefore already provided anyway. Suitable data carriers for providing the computer program, in particular, are magnetic, optical and electric memories, such as hard disks, flash memories, EEPROMs, DVDs, and others. A download of a program via computer networks (internet, intranet, etc.) is possible as well.

Additional advantages and further developments of the present invention are described herein and are shown in the figures.

The present invention is schematically illustrated in the drawing with the aid of exemplary embodiments and will be described with reference to the drawing in the following text.

DETAILED DESCRIPTION OF EXAMPLE EMBODIMENTS

Figure 1:
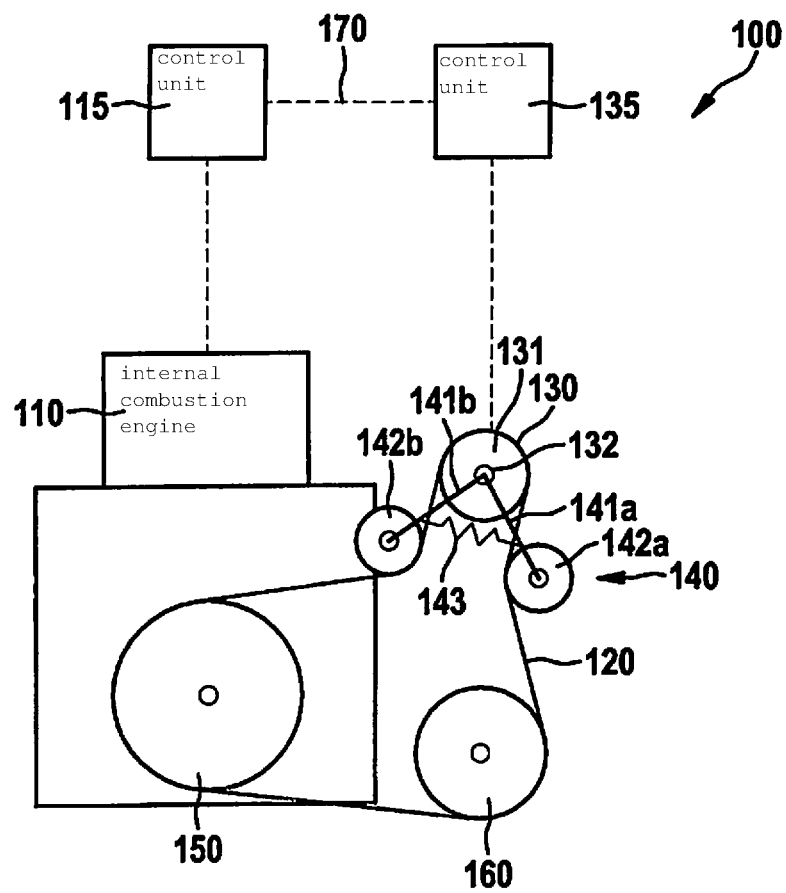
FIG. 1 schematically illustrates a belt drive of a motor vehicle having an internal combustion engine and a belt-driven starter generator, which is set up to execute a preferred specific embodiment of a method according to the present invention.

FIG. 1 schematically shows a belt drive of a motor vehicle, which is denoted by 100.

An internal combustion engine 110 of the motor vehicle has a crankshaft, which is connected to a crankshaft drive wheel 150 in a torsionally fixed manner. Crankshaft drive wheel 150 is developed as a belt pulley, for example.

Via a belt 120, e.g., via a ribbed V-belt, internal combustion engine 110 is connected to a belt-driven starter generator 130 in a torque-transmitting manner. Belt 120 in particular engages in a non-positive and/or positive manner with crankshaft drive wheel 150 and with a drive wheel 131 of starter generator 130. Drive wheel 131 is connected to a rotor of starter generator 130 in a torsionally fixed manner. Internal combustion engine 110 may be connected to further components 160 such as ventilators or coolant pumps via belt 120.

A first control unit 115 is specifically set up for controlling internal combustion engine 110, and a second control unit 135 is specifically set up for controlling starter generator 130. Control units 115 and 135 are connected to each other in a data-transmitting connection via a field bus 170, such as a CAN bus, in particular. Second control unit 135 is specifically set up for executing a preferred specific embodiment of the method according to the present invention. It is pointed out that, as an alternative or in addition, first control unit 115 may also be set up for executing a preferred specific embodiment of the method according to the present invention.

A starter generator is able to be operated as a motor and also as a generator. The belt must therefore be able to transmit torque in both directions. For this reason, the belt is developed as a ribbed V-belt, for example. Depending on whether starter generator 130 is operated in a motor mode or a generator mode, the taut strand and slack strand of belt 120 change. In addition, a corresponding belt tensioner 140 is provided for preloading belt 120. Belt tensioner 140 may be developed as a pendulum-type belt tensioner, which includes two pendulum arms 141a and 141b, for instance, which are connected to each other especially via a spring mechanism 143. For example, axes of rotation of these two pendulum arms 141a and 141b are co-linear with respect to an axis of rotation 132 of drive wheel 131 of starter generator 130. Other specific embodiments of pendulum-type belt tensioners or two-arm tensioners that have axes that are not co-linear with respect to the axis of rotation of the starter generator are also possible. This axis of rotation 132 of drive wheel 131 thus also simultaneously represents an axis of rotation of the pendulum-type belt tensioner 120. Each pendulum arm 141a and 141b is connected to a separate tension roller 142a and 142b, respectively.

Figure 2B:
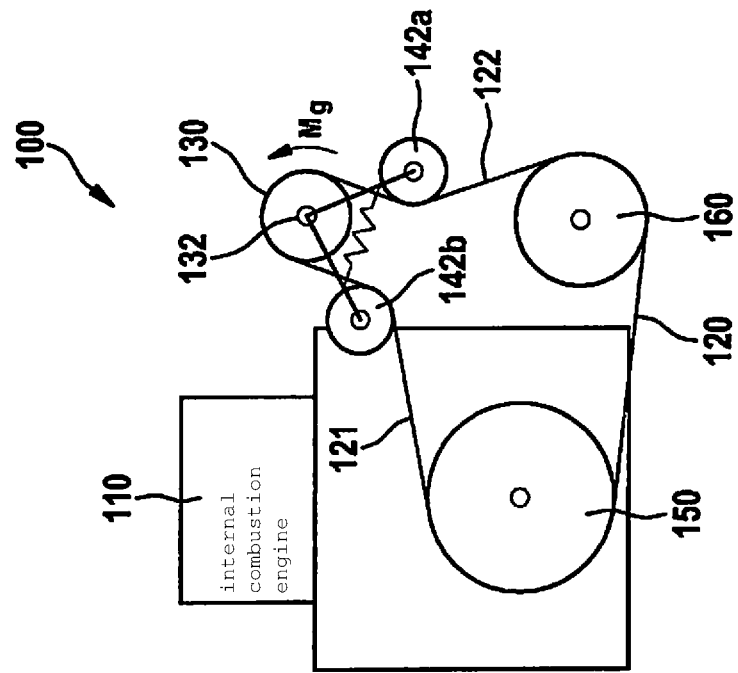
FIGS. 2a and 2b schematically show a belt drive of a motor vehicle having an internal combustion engine and a belt-driven starter generator, which is operated in a motor mode and in a generator mode.
Figure 2A:
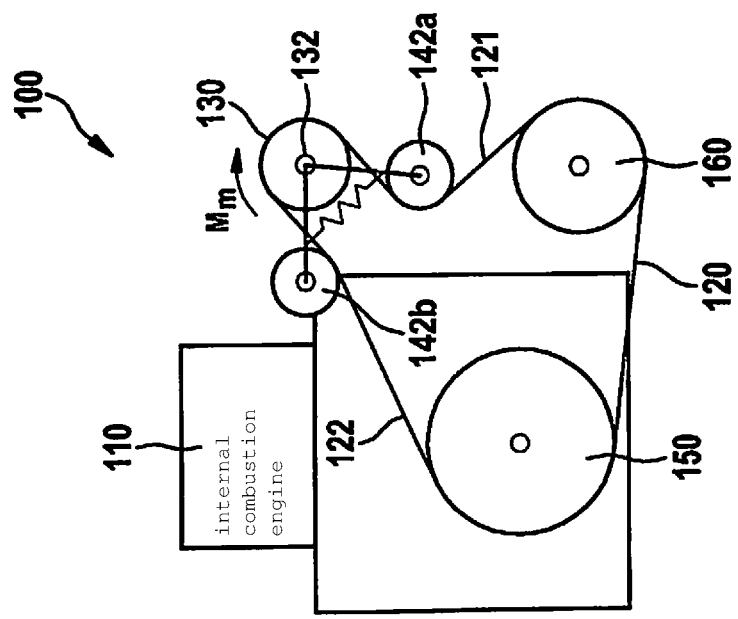

FIGS. 2a and 2b show belt drive 100 analogous to FIG. 1. Starter generator 130 is shown in a motor mode in FIG. 2a, and in a generator mode in FIG. 2b.

For example, in the motor mode according to FIG. 2a, drive wheel 131 of starter generator 130 is rotating at a rotational speed ω about axis of rotation 132. In this case torque is transmitted via belt 120 from starter generator 130 to internal combustion engine 110. Starter generator 130 generates a drive torque $M_m$. In this case, a belt section of belt 120 between drive wheel 131 and crankshaft drive wheel 150 forms taut strand 122, and a belt section between drive wheel 131 and further component 160 forms slack strand 121.

In the generator mode according to FIG. 2b, drive wheel 131 rotates at a rotational speed co, for example. In this case, torque is transmitted via belt 120 from internal combustion engine 110 to starter generator 130. Starter generator 130 now generates a braking torque $M_g$ instead of a drive torque $M_m$. The positions of taut strand 122 and slack strand 121 are reversed in comparison with the motor mode.

Depending on which type of torque is generated by starter generator 130, the position of pendulum-type belt tensioner 140 and belt 120 changes. The arms of pendulum-type belt tensioner 140 rotate about axis of rotation 132 in the direction of taut strand 122.

Special properties of belt 120, in particular its length, are precisely adapted to the system made up of internal combustion engine 110, starter generator 130, and further components 160. Wear and elongation of the belt may lead to restricted functioning of belt drive 100, e.g., to diminishing preloading and thus to a diminishing transmittable torque.

Figure 3:
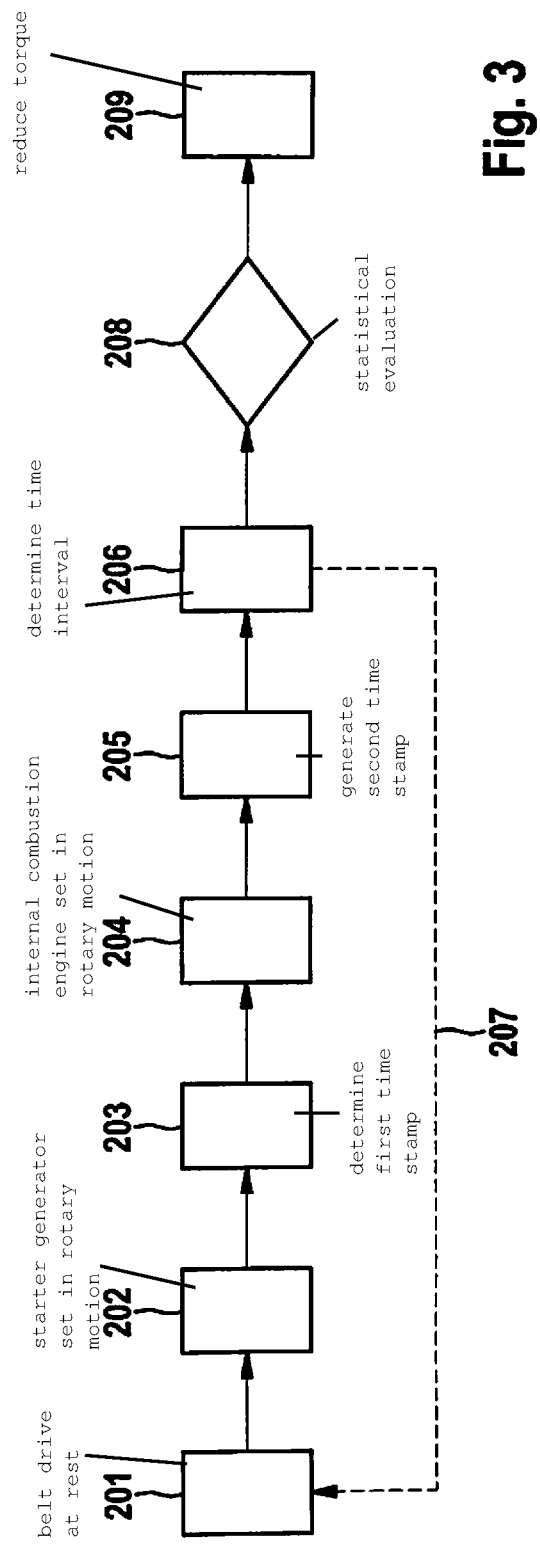
FIG. 3 schematically shows a preferred specific embodiment of a method according to the present invention in the form of a block diagram.

For the timely detection of a structural change of belt 120 that exceeds a permissible measure, for extending the service life of belt 120, for avoiding excessive stressing of a belt 120 that exhibits wear, and for avoiding tearing of a worn belt 120, control unit 135, for example, is designed to execute a preferred specific embodiment of a method according to the present invention, which is schematically shown in the form of a block diagram in FIG. 3.

In step 201, belt drive 100 is at rest and neither internal combustion engine 110 nor starter generator 130 is being operated. In this case, pendulum-type belt tensioner 140 is not deflected and is in its position of rest or its center position. Belt 120 is likewise in its position of rest and is not deflected.

Internal combustion engine 110 is to be started up with the aid of starter generator 130. For this purpose, starter generator 130 is operated in the motor mode. In step 202, starter generator 130 is set into a rotary motion.

As soon as second control unit 135 detects this onset of the rotary motion of starter generator 130, second control unit 135 determines a first time stamp according to step 203.

Because of the generated torque in starter generator 130, pendulum-type belt tensioner 140 and belt 120 are deflected from their respective positions of rest. The taut strand is shortened, and the slack strand is lengthened. As soon as the taut strand has been sufficiently tensioned, internal combustion engine 110 is also set into rotary motion in step 204. This onset of the rotary motion is usually detected by first control unit 115, e.g., by monitoring a crankshaft pulse-generating wheel. According to step 205, first control unit 115 generates a second time stamp and notifies second control unit 135 accordingly via the CAN bus. Using the first and the second time stamps, the time interval between the onset of the rotary motion of starter generator 130 and internal combustion engine 110 is determined in second control unit 135 according to step 206.

This determination of the time interval is repeated especially upon each start of internal combustion engine 110 with the aid of starter generator 130, which is sketched by reference numeral 207. As a result, a multitude of time intervals is determined, which may be stored in second control unit 135, for instance.

With each newly determined time interval, the time intervals are evaluated and compared to a reference value. A statistical evaluation of the stored multitude of time intervals is carried out for this purpose in step 208. In particular, a time sequence analysis is performed, the time sequence analysis making it possible to determine a trend of the time interval.

If the evaluation indicates that a respective difference between the determined time interval and the reference value reaches a threshold value over a certain number of starting operations of internal combustion engine 110 (for instance over at least five starting operations), then a structural change of belt 120 that exceeds a permissible measure will be detected.

If a structural change in belt 120 is detected, the torque of starter generator 130 as well as that of further components 160 is reduced in step 209 as a function of the structural change of belt 120.

Depending on the extent to which the determined time interval exceeds the threshold value in each case, a permissible maximum value of the torque is restricted to different degrees. The greater the difference between the respectively determined time interval and the reference value, the more the torque of starter generator 130 and of further components 160 will be restricted, or the lower the permissible maximum value of the torque will be selected.

The torque of the BSG may be restricted in stages of 5 Nm, for instance. As an alternative or in addition, active components of the belt drive are also able to be switched off under different operating conditions (e.g., an engine start). Although this may result in a restriction of the function of the corresponding components in the belt drive (such as a slightly extended motor startup time), no unexpected function failure (such as a belt breakaway) will be encountered.

In addition, according to step 209, a warning lamp may be activated in an area of an instrument panel of the vehicle, for example, and/or an error entry in an error memory may be made.

Figure 4:
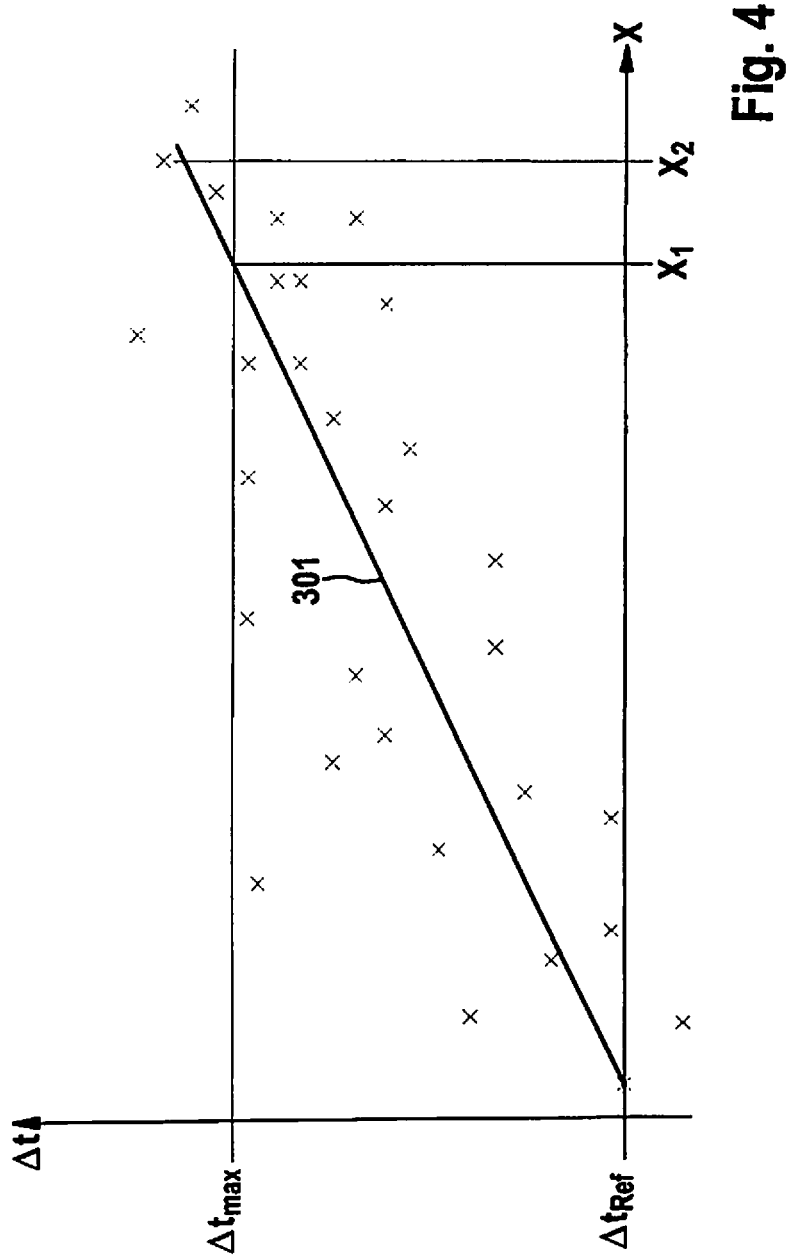
FIG. 4 schematically shows a diagram of time intervals plotted against starting operations of an internal combustion engine, the diagram being able to be determined in the course of a preferred specific embodiment of a method according to the present invention.

FIG. 4 schematically shows a diagram that is able to be determined in the course of the statistical evaluation of the time intervals. The individual time intervals Δt have been plotted against the associated startup operation X during which they had been determined in each case. With the aid of the time sequence analysis, a trend or a trend curve 301 of the determined time intervals is established in the form of a linear function.

If the difference between the respectively determined time interval Δt and reference value $\Delta t_{Ref}$ exceeds the threshold value, this especially corresponds to an exceeding of a permissible maximum value $\Delta t_{max}$ of determined trend curve 301. As soon as trend curve 301 exceeds maximum value $\Delta t_{max}$ over a certain number of starting operations (e.g., between starting operations $X_1$ and $X_2$), a structural change of the belt that exceeds a permissible degree is detected.

In the following text, a mathematical correlation between the time interval and geometrical variables of the belt drive will be explained with the aid of FIGS. 5a-5c, in which a portion of the belt drive is schematically illustrated analogous to FIGS. 1, 2a and 2b during the startup of internal combustion engine 110 with the aid of starter generator 130.

Figure 5C:
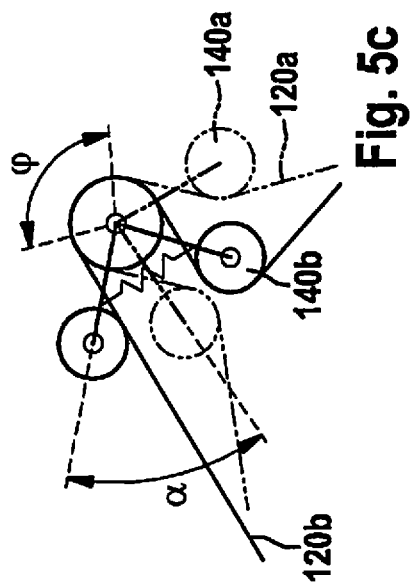
FIG. 5a-5c schematically show a belt drive of a motor vehicle having an internal combustion engine and a belt-driven starter generator while the internal combustion engine is started with the aid of the belt-driven starter generator.
Figure 5B:
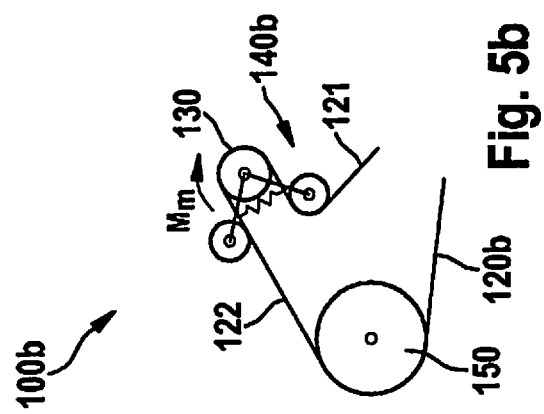
Figure 5A:
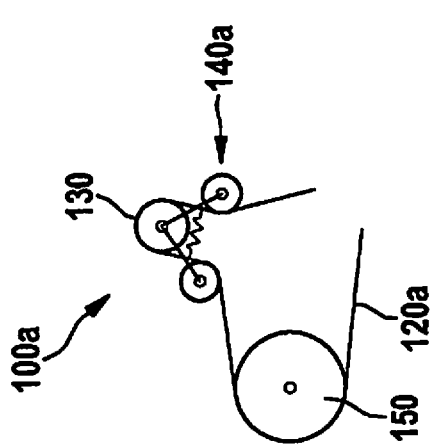

In FIG. 5a, the belt drive is schematically shown in the position of rest and denoted by 100a. Pendulum-type belt tensioner 140a and belt 120a are in their respective positions of rest. FIG. 5b shows the belt drive, denoted by 100b, after time interval Δt following the onset of the rotary motion of starter generator 130. Pendulum-type belt tensioner 140b is deflected in this case, and the taut strand is sufficiently shortened in order to set internal combustion engine 110 into a rotary motion.

FIG. 5c shows the pendulum-type belt tensioner in its position of rest (140a) and in its correspondingly deflected position (140b). Deflected pendulum-type belt tensioner 140b is deflected by an angle of deflection α in comparison with its position of rest 140a.

The deflection of pendulum-type belt tensioner 140 counteracts inertia of mass J of starter generator 130, in particular. The following correlation exists between torque M of starter generator 130, its inertia of mass J, and the change in rotational speed ω of starter generator 130 or its drive wheel 131:

$$M = J\frac{d\omega}{dt} = J\frac{d^2\varphi}{dt^2}$$

The covered angle of rotation φ of starter generator 130 or its drive wheel 131 results from this correlation as follows:

$$\varphi = \int\int\frac{M}{J}dtdt$$

Time interval Δt between the onset of the rotary motion of starter generator 130 and internal combustion engine 110 results from this equation as follows:

$$\Delta t = \sqrt{\frac{2J\varphi_{erf}}{M}}$$

$\varphi_{erf}$ denotes the required angle of rotation for starting internal combustion engine 110. The breakaway torque required for starting internal combustion engine 110 in particular defines a required angle of deflection $\alpha_{erf}$ of belt tensioner 140, which in turn is proportional to angle of rotation φ of starter generator 130, in particular.

A reference value for time interval Δt for a new, wear-free belt lies in the low ms range, for instance, and may amount to 16 ms, for example. A structural change of the belt that exceeds a permissible measure leads to reduced preloading and to a change in the position of rest of the pendulum-type belt tensioner in particular. This increases the required angle of deflection $\alpha_{erf}$, and time interval Δt becomes greater.

What is claimed is:

1. A method for operating a belt-driven starter generator of an internal combustion engine, comprising:
   determining a time interval between an onset of a rotary motion of the belt-driven starter generator and an onset of a rotary motion of the internal combustion engine;
   comparing the determined time interval to a reference value and inferring a structural change of a belt of the belt-driven starter generator from the comparison; and
   restricting, as a function of the structural change of the belt, at least one of: (i) a torque of the belt-driven starter generator, and (ii) a torque of a component connected to the belt.

2. The method as recited in claim 1, wherein the component connected to the belt is deactivated as a function of the structural change of the belt.

3. The method as recited in claim 1, wherein at least one of: (i) the torque of the belt-driven starter generator, and (ii) the torque of the component connected to the belt, is restricted if the structural change of the belt reaches a threshold value.

4. The method as recited in claim 1, wherein at least one of: (i) the torque of the belt-driven starter generator, and (ii) the torque of the component connected to the belt, is restricted when a difference between the determined time interval and the reference value reaches a threshold value.

5. The method as recited in claim 1, wherein at least one of: (i) the torque of the belt-driven starter generator, and (ii)

the torque of the component connected to the belt, is restricted as a function of an extent of the structural change of the belt.

6. The method as recited in claim 1, wherein the time interval is determined when the internal combustion engine is started with the aid of the belt-driven starter generator.

7. The method as recited in claim 1, wherein a multitude of time intervals is determined, and the multitude of time intervals is statistically evaluated and compared to the reference value.

8. The method as recited in claim 7, wherein at least one of: (i) a statistical mean value is determined from the multitude of time intervals in the course of the statistical evaluation, and (ii) a time sequence analysis is carried out.

9. The method as recited in claim 1, wherein at the onset of the rotary motion of the belt-driven starter generator, a first time stamp is determined or received, and at the onset of the rotary motion of the internal combustion engine, a second time stamp is determined or received, and the time interval is determined from the first time stamp and the second time stamp.

10. The method as recited in claim 1, wherein when the structural change of the belt is detected, at least one of: (i) an error entry is made in an error memory, and (ii) a visual and/or an acoustic notification is output.

11. An arithmetic unit, designed to operate a belt-driven starter generator of an internal combustion engine, the arithmetic unit designed to:

determine a time interval between an onset of a rotary motion of the belt-driven starter generator and an onset of a rotary motion of the internal combustion engine;

compare the determined time interval to a reference value and inferring a structural change of a belt of the belt-driven starter generator from the comparison; and restrict, as a function of the structural change of the belt, at least one of: (i) a torque of the belt-driven starter generator, and (ii) a torque of a component connected to the belt.

12. A non-transitory machine-readable storage medium on which is stored a computer program having program code for operating a belt-driven starter generator of an internal combustion engine, the computer program, when executed by a processor, causing the processor to perform:

determining a time interval between an onset of a rotary motion of the belt-driven starter generator and an onset of a rotary motion of the internal combustion engine;

comparing the determined time interval to a reference value and inferring a structural change of a belt of the belt-driven starter generator from the comparison; and restricting, as a function of the structural change of the belt, at least one of: (i) a torque of the belt-driven starter generator, and (ii) a torque of a component connected to the belt.

* * * * *